No. 761,034. PATENTED MAY 24, 1904.
J. M. DODGE.
CHAIN.
APPLICATION FILED APR. 1, 1904.
NO MODEL. 2 SHEETS—SHEET 1.
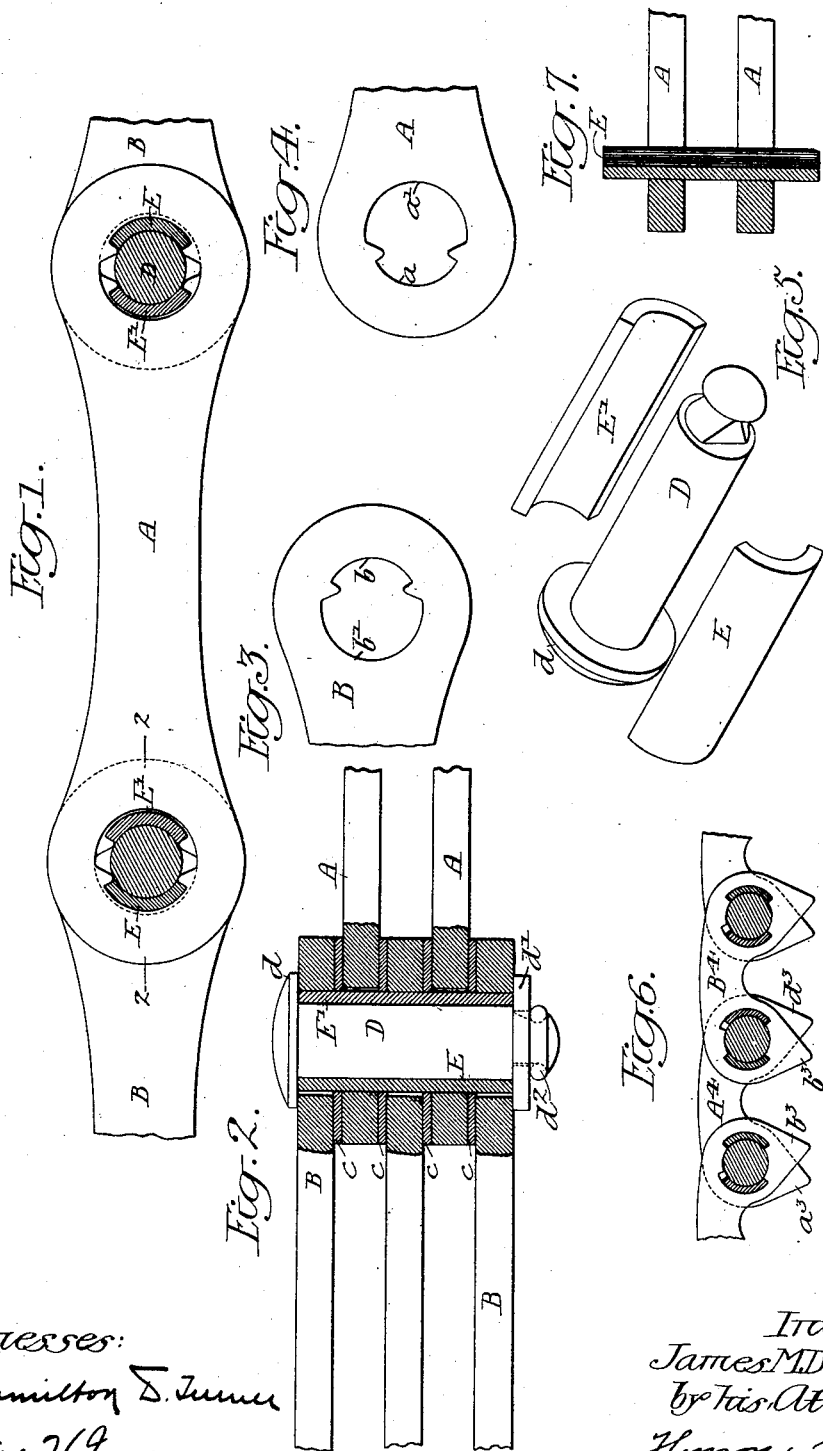
Witnesses:
Hamilton D. Turner
Titus H. Irons
Inventor
James M Dodge.
by his Attorneys

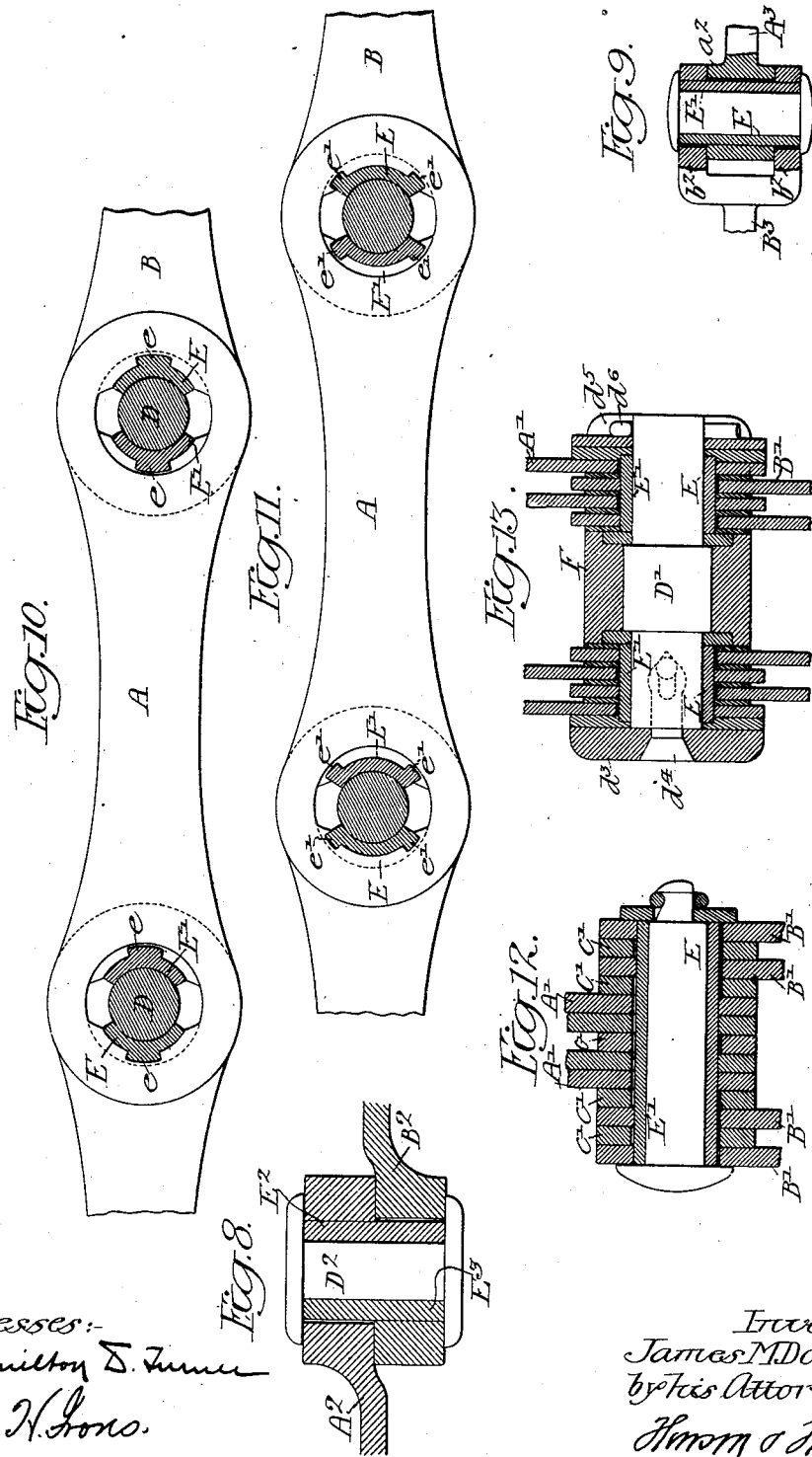

No. 761,034.

Patented May 24, 1904.

UNITED STATES PATENT OFFICE.

JAMES M. DODGE, OF PHILADELPHIA, PENNSYLVANIA.

CHAIN.

SPECIFICATION forming part of Letters Patent No. 761,034, dated May 24, 1904.

Application filed April 1, 1904. Serial No. 201,123. (No model.)

*To all whom it may concern:*

Be it known that I, JAMES M. DODGE, a citizen of the United States, residing in Philadelphia, Pennsylvania, have invented certain Improvements in Chains, of which the following is a specification.

My invention relates to certain improvements in chains of the type broadly claimed in an application for patent filed by me on the 17th day of March, 1904, Serial No. 198,655, in which extended bearings are provided for the links or elements of the chain upon a pivot-pin.

The main object of my present invention is to provide means for taking the wear at the pivot-point of chain; and a further object of the invention is to provide a long bearing for a chain made of a series of flat elements arranged side by side; and a still further object is to so construct the chain that the pivot-pins shall be free to turn within the bushings, so as to prevent uneven wear of said pins. These objects I attain in the following manner, reference being had to the accompanying drawings, in which—

Figure 1 is a longitudinal sectional view of sufficient of a drive-chain to illustrate my invention. Fig. 2 is a sectional plan view on the line 2 2, Fig. 1. Figs. 3 and 4 are detached views of the end portions of two links. Fig. 5 is a detached perspective view of the pivot-pin and the bushings. Fig. 6 is a view showing my invention applied to a toothed chain. Fig. 7 is a diagram view of a portion of Fig. 2. Fig. 8 is a sectional view showing two links coupled together and illustrating my invention. Fig. 9 is a sectional view showing two links, one of which is forked, coupled together and provided with segmental bushings. Figs. 10 and 11 are views of modified forms of bushings, and Figs. 12 and 13 are sectional views showing different arrangements of the links.

Referring in the first instance to Figs. 1 to 5, inclusive, the chain is an ordinary form of drive-chain made up of a series of flat link elements A and B, one element alternating with another in the present instance, as shown in Fig. 2, the number of elements depending upon the width of chain desired. D is a pivot-pin coupling the series of links B to the series of links A. The pin has a head $d$ in the present instance at one end, and at the other end is arranged to receive a washer $d'$ and a spring-ring $d^2$; but the ends of the pivot may be riveted or secured in any manner without departing from my invention. In the ordinary construction of chains of this type the links A and B are simply bored, and when the pivot is in position the links rest directly on the pivot, and when strain is put upon the chain the narrow links tend to cut the pivot and wear away more or less. In order to increase the life of the chain, I provide segmental bushings E E', which partly surround the pivot-pin, as clearly shown in Fig. 1. These bushings preferably extend from one side of the chain to the other, as shown in Fig. 2, and the links A of the chain are recessed at $a$, Fig. 4, to receive the segmental bushing E, which snugly fits the recess, so that there is no independent movement of the link on the bushing. The bushing is made of hardened metal and has its bearing upon the pivot. The adjoining link of the series B is recessed at $b'$, the recess $b'$ being considerably larger than the recess $a$ in order to allow a certain amount of play, as indicated in Fig. 1, to enable the chain to accommodate itself to a sprocket-wheel or pass around curves. The links B are recessed at $b$, Fig. 3, to receive the segmental bushing E', and the links A are recessed at $a'$ to allow for the free play of the bushing E' in the link. It will be seen that the bushing E takes the bearing of the links A on the pivot, and the bushing E' takes the bearing of the links B on the pivot, and, as it will be noticed in Fig. 2, the bushings provide an extended bearing throughout the entire length of the pivot-pin, which is free to turn in both bearings, so that the wear will be distributed over the entire surface of the pin.

By my invention I not only prevent the wear upon the links of the chain, but I make an extended bearing for the narrow link elements, as clearly shown in Figs. 2 and 7, Fig. 7 being a view of the link elements A and the bushing E detached to give an idea of the increase in the bearing-surface. I also increase the bearing-surface by introducing washers c between the link elements, as shown in Fig. 2, when it is desired to make a comparatively wide chain.

In Fig. 12 I have shown a different arrangement of the link elements. The elements A' are arranged in pairs, and the elements B' are placed outside the elements A' and spaced by washers c', and other washers are placed between the elements A' and B' and between the two pairs of elements A'. The washers in this instance are the same thickness as the link elements, making a very wide chain.

In Fig. 13 I have shown another form in which the pivot-pin D' is reduced in diameter at each end and the links of the chain are suitably spaced so that a roller F can be mounted on the pivot-pin D', and in this instance one head, $d^3$, of the pivot-pin is secured to the pin by a rivet $d^4$, and the other head, $d^5$, is secured to the pin by a cotter $d^6$.

In Fig. 8 I have shown one of the simplest forms of chains illustrating my invention, in which the two links $A^2$ and $B^2$ are coupled by a pivot-pin $D^2$ extending through an opening in each link, and carried by the link $A^2$ is a segmental bearing or bushing $E^2$, extending into the opening in the link $B^2$, and carried by the link $B^2$ is a segmental bearing or bushing $E^3$, extending into the opening in the link $A^2$.

In Fig. 9 I have shown two links $A^3$ and $B^3$ coupled with my improved bushing-and-pin connection. The link $A^3$ has a head $a^2$, which fits between the forks $b^2$ of the link $B^3$. The segmental bushings extend through the head and the forks, so that the bearing of both links is materially increased, and the wear is taken by the segments and not by the links.

In Fig. 6 I have shown my invention as applied to a chain known as a "silent" chain—that is, a chain in which the links $A^4$ and $B^4$ have teeth $a^3$ and $b^3$, formed to engage the teeth of a sprocket-wheel. My invention is particularly adapted to this chain, as the link elements are usually very narrow.

In Fig. 1 I have shown plain segmental bushings snugly fitting recesses in the links, while in Fig. 10 I have shown the bushings provided with ribs e at the back which rest in grooves in their respective links, while in Fig. 11 I have shown the bushings with ribs $e'$ on each edge fitting in grooves or notches in their respective links.

It will be understood that the means of attaching the bushings to their links may be modified without departing from my invention.

The construction shown in Fig. 13 is fully described and claimed in the application filed by me April 4, 1904, Serial No. 201,497.

I claim as my invention—

1. The combination in a chain, of two links, a pivot-pin coupling the two links, two segmental bushings bearing upon the pivot-pin, one bushing attached to one link and the other bushing attached to the other link, substantially as described.

2. The combination in a chain, of two links, a pivot-pin coupling the two links, and two segmental bushings, each link having an opening for the reception of the pivot-pin and the bushings, one bushing being attached to one link and the other bushing attached to the other link, substantially as described.

3. The combination of two links, a pivot-pin coupling the two links, each link having a narrow and a wide segmental recess, two bushings, one bushing fitting the narrow recess of one link and the other bushing fitting the narrow recess of the other link, substantially as described.

4. The combination in a chain, of two sets of link elements, a pivot-pin connecting the elements, and two segmental bushings bearing upon the pivot-pin, one bushing carried by one set of link elements and the other bushing carried by the other set of link elements, substantially as described.

5. The combination in a chain, of two sets of link elements, a pivot-pin connecting the links, two segmental bushings bearing upon the pivot-pin, one bushing attached to one set of link elements and the other bushing attached to the other set of link elements, and washers spacing the elements, substantially as described.

6. The combination in a chain, of two sets of link elements, a pivot-pin coupling the links, two segmental bushings mounted on the pivot-pin, each link element having a wide and a narrow recess for the accommodation of the bushings, one bushing fitting the narrow recesses of one set of link elements and the other bushing fitting the narrow recesses of the other set of link elements, the wide recesses in the link elements allowing sufficient play for the chain to accommodate itself to a sprocket-wheel or to pass around a curve, substantially as described.

7. The combination of two links, a segmental bushing attached to each link, and a pivot-pin free to move upon the segmental bearing-surfaces of both bushings, substantially as described.

8. The combination in a chain, of two sets of link elements, two segmental bushings, one bushing carried by one set of link elements and the other bushing carried by the other set of link elements, and a pivot-pin free to move upon the segmental bearing-surfaces of both bushings, substantially as described.

9. As a new article of manufacture, a chain-link having an opening for the reception of a pivot-pin and having a wide and a narrow recess for the accommodation of bushings, substantially as described.

10. As a new article of manufacture, a chain-link having an opening for the reception of a pivot-pin and two segmental bushings, and having means by which one of said bushings is prevented from turning independently of the link, substantially as described.

11. As a new article of manufacture, a chain-link having an opening at each end for the reception of a pivot-pin and two segmental bushings, said link having means by which one of said bushings at each end is prevented from turning independently of the link, substantially as described.

In testimony whereof I have signed my name to this specification in the presence of two subscribing witnesses.

JAMES M. DODGE.

Witnesses:
   WILL. A. BARR,
   JOS. H. KLEIN.